United States Patent
Talbert

(10) Patent No.: US 9,189,175 B2
(45) Date of Patent: Nov. 17, 2015

(54) SYSTEMS AND METHODS FOR CARBON FOOTPRINT JOB BASED ACCOUNTING

(75) Inventor: Bruce E. Talbert, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1667 days.

(21) Appl. No.: 12/484,765

(22) Filed: Jun. 15, 2009

(65) Prior Publication Data

US 2010/0315667 A1    Dec. 16, 2010

(51) Int. Cl.
*G06F 3/12*    (2006.01)

(52) U.S. Cl.
CPC ............ *G06F 3/1203* (2013.01); *G06F 3/1263* (2013.01)

(58) Field of Classification Search
None
See application file for complete search history.

(56) References Cited

U.S. PATENT DOCUMENTS

| | | |
|---|---|---|
| 7,343,341 B2 | 3/2008 | Sandor et al. |
| 7,426,489 B2 | 9/2008 | van Soestbergen et al. |
| 7,440,871 B2 | 10/2008 | McConnell et al. |
| 7,996,287 B2 * | 8/2011 | Hamilton et al. ............... 705/30 |
| 2005/0231758 A1 * | 10/2005 | Reynolds ..................... 358/1.15 |
| 2007/0260405 A1 | 11/2007 | McConnell et al. |
| 2008/0015975 A1 | 1/2008 | Ivchenko et al. |
| 2008/0015976 A1 | 1/2008 | Sandor et al. |
| 2008/0183523 A1 | 7/2008 | Dikeman |
| 2008/0201255 A1 | 8/2008 | Green |
| 2008/0240826 A1 * | 10/2008 | Shen .............................. 400/62 |
| 2008/0255899 A1 | 10/2008 | McConnell et al. |
| 2009/0210295 A1 * | 8/2009 | Edholm et al. .................. 705/11 |

* cited by examiner

*Primary Examiner* — Hilina K Demeter
(74) *Attorney, Agent, or Firm* — Fox Rothschild LLP

(57) ABSTRACT

A system may include a processor, a printing device, a communication interface operably connected to the processor, and a computer-readable storage medium in communication with the processor. The computer-readable storage medium may include one or more programming instructions for identifying a carbon credit account associated with at least a user, receiving a print job request from the user, receiving a carbon emission value for the print job request, determining whether to accept the print job request based on the carbon emission value and the carbon credit amount, and performing, via the printing device, the print job request in response to accepting the print job request. The carbon credit account may include a carbon credit amount.

20 Claims, 5 Drawing Sheets

SYSTEMS AND METHODS FOR CARBON FOOTPRINT JOB BASED ACCOUNTING

BACKGROUND

Global awareness has led to increased concern regarding the amount of carbon or equivalent emissions being released into the atmosphere. A measurement of these emissions is generally referred to as a carbon footprint. Many entities are interested in calculating their carbon footprint. Such calculations can assist with determining methods of reducing associated emissions. For example, factors can be monitored such as gas usage, electricity usage and mileage associated with travel to calculate a carbon footprint. Carbon footprints can be calculated for a personal household, an international corporation, or any other entity.

Within a business environment, office products tend to consume large amounts of energy and greatly contribute to an entity's carbon footprint. For example, office products can include fleets of equipment such as copiers, printers and multi-function devices. Energy costs associated with print jobs performed by these office products is another contributing factor to the entity's carbon footprint.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "device" is a reference to one or more devices and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a system may include a processor, a printing device, a communication interface operably connected to the processor, and a computer-readable storage medium in communication with the processor. The computer-readable storage medium may include one or more programming instructions for identifying a carbon credit account associated with at least a user, receiving a print job request from the user, receiving a carbon emission value for the print job request, determining whether to accept the print job request based on the carbon emission value and the carbon credit amount, and performing, via the printing device, the print job request in response to accepting the print job request. The carbon credit account may include a carbon credit amount.

In an embodiment, a method for determining acceptability of a print job request associated with a user may include identifying, via a processor, a carbon credit account associated with at least a user, receiving a print job request from the user, receiving, from a printing client, a carbon emission value for the print job request, determining, via the processor, whether to accept the print job request based on the carbon emission value and the carbon credit amount, and performing, via a printing device, the print job request in response to accepting the print job request. The carbon credit account may include a carbon credit amount.

BRIEF DESCRIPTION OF THE DRAWINGS

Aspects, features, benefits and advantages of the present application will be apparent with regard to the following description and accompanying drawings, of which.

DETAILED DESCRIPTION

The following terms shall have, for the purposes of this application, the meanings set forth below.

A "printing device" is an electronic device that is capable of receiving commands and printing text and/or images on a substrate. Printing devices may include, but are not limited to, network printers, production printers, copiers, facsimile devices, other devices using ink or toner, and scanners. Printing devices may also perform a combination of functions, such as printing/scanning/copying/faxing, in which case such devices are considered to be multifunctional devices.

A "carbon credit account" is an account associated with a user having access to a printing device. The account includes a carbon credit amount that may be specific to the particular user and/or a particular project. The carbon credit amount is an amount which may reflect an estimated valuation calculated as a function of an amount of carbon and other emissions released due to a print job request, or rather, to a carbon footprint of a printing device.

A "carbon emission value" is a valuation for a print job request calculated as a function of the factors of usage contributing to a carbon footprint of a printing device, particularly where a print job is requested having specified printing parameters.

An "energy cost" is an amount of energy consumed by a device when performing an operation. An energy cost may be based on factors such as page length, resolution, color, page coverage and/or the like for a print job request. Other factors may include an associated electricity usage and/or paper usage for the print job request.

Figure 1:
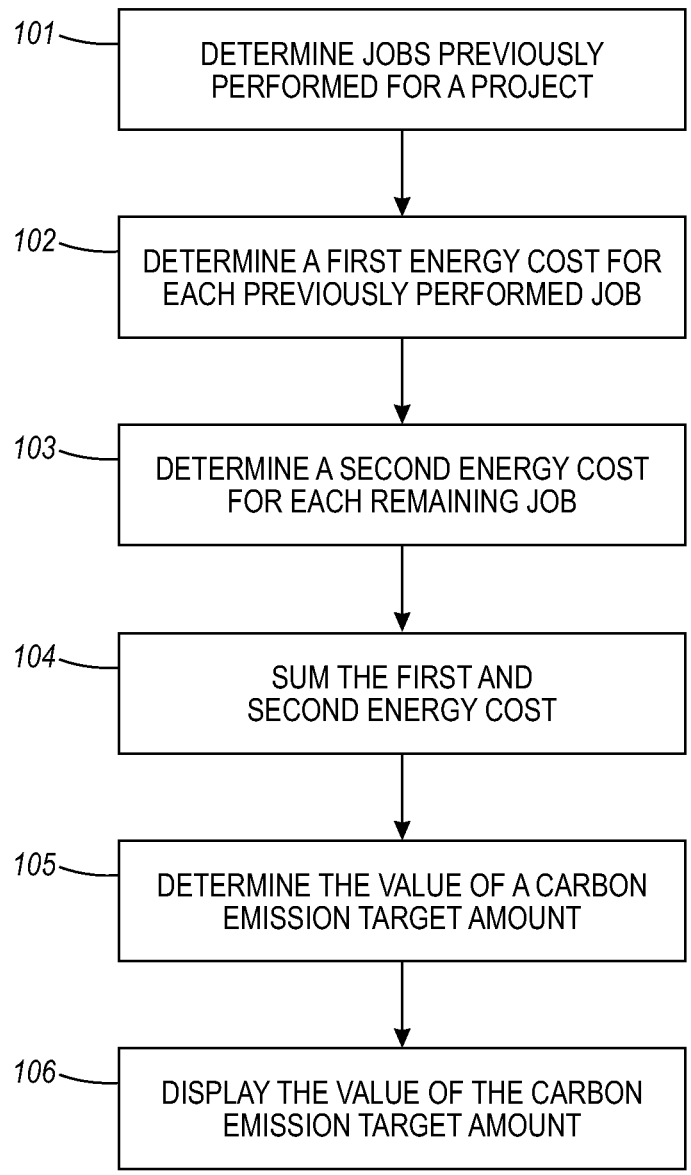
FIG. 1 depicts a flow diagram of an exemplary method of determining a carbon emission target amount according to an embodiment.

FIG. 1 depicts a flow diagram of an exemplary method of determining a carbon emission target amount according to an embodiment. As shown in FIG. 1, one or more jobs that have previously been performed for a project may be determined 101. Energy consumption amounts and/or other information relating to the one or more previously performed jobs may be stored in a database in a computer-readable memory, wherein the database may be termed a historical database. Details maintained in the historical database may include fields such as page length, cost per page length, printing time, cost to print per minute, and/or the like. The historical database may receive data for previously performed jobs. The historical database may be filtered into specific projects. The data for previously performed jobs under a filtered project field may be determined.

A first energy cost for each previously performed job may be determined 102. In an embodiment, a first energy cost may be determined 102 from details maintained in the historical database, which may contain fields such as page length, cost per page length, printing time, cost to print per minute, and/or the like. A first energy cost calculation may be based on a factor relating to an associated electricity usage. Alternatively, a first energy cost calculation may be based on a factor relating to an associated paper output usage.

A second energy cost for each of one or more remaining jobs may be determined 103. In an embodiment, a second energy cost may be received from a client-based module, which may predict the carbon footprint of the one or more remaining jobs based on the information maintained in the historical database. A second energy cost calculation may be based on a factor relating to an associated electricity usage. Alternatively, a second energy cost calculation may be based on a factor relating to an associated paper output usage.

The first and second energy costs may be summed 104 to determine a total remaining energy cost. In an embodiment, the first and second energy costs may include the same factor, such as electricity usage, paper output usage and/or the like. In an alternate embodiment, the first and second energy costs may be determined using multiple factors.

A value of a carbon emission target amount may be determined 105 by a processor based on the total remaining energy cost. For example, the total remaining energy cost may be converted to a unit suitable for a carbon emission measurement, referred to herein as the carbon emission target amount. The carbon emission target amount may represent a cap on an amount of carbon emissions expected to be generated for a project as determined in light of jobs associated with the project.

In an embodiment, the value of the carbon emission target amount may be displayed 106, such as on a display screen associated with a processing device. Additional and/or alternate ways of displaying the value of the carbon emission target amount may be used within the scope of this disclosure.

In an embodiment, each remaining job may be performed, and a third energy cost may be determined for each performed job. In an embodiment, a third energy cost reflecting actual energy consumed for a performed job may be received from a printing device, a marking device-based module, and/or the like. A third energy cost calculation may be based on an amount of electricity used to perform the job and/or an associated amount of paper used.

The first and third energy costs may be summed to determine a total energy cost. Further, an actual carbon emission value may be determined based on the total energy cost. The difference between the actual carbon emission value and carbon emission target amount may be displayed.

Figure 2:
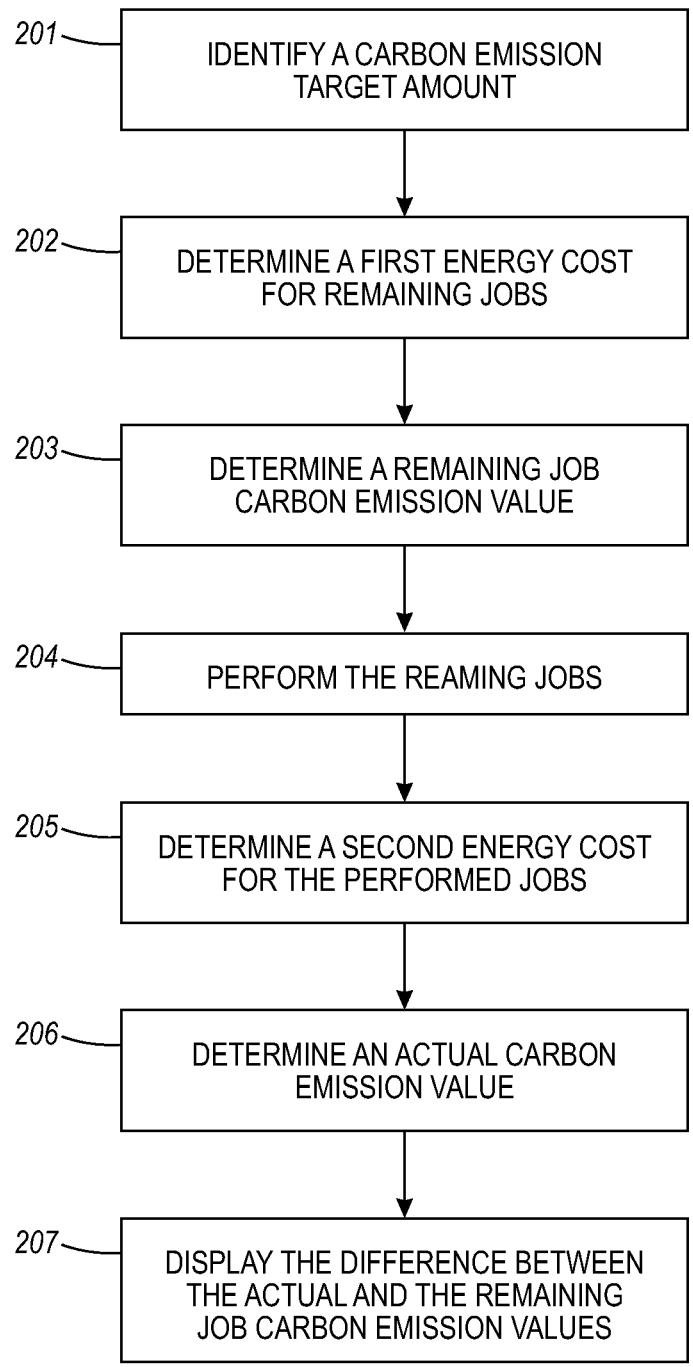
FIG. 2 depicts a flow diagram of an exemplary method of automatically measuring an actual carbon emission amount for a printing device according to an embodiment.

FIG. 2 depicts a flow diagram of an exemplary method of automatically measuring an actual carbon emission amount for a printing device according to an embodiment. As shown in FIG. 2, a carbon emission target amount may be identified 201. The carbon emission target amount may be recognized as any value. Identification 201 of the carbon emission target amount may include a value received from a user. Alternatively, identification 201 of the carbon emission target amount may be determined by an automatic calculation based on information stored in a database. This information may include historical records of one or more factors, such as paper usage for previous print jobs and predicted records for remaining jobs.

A first energy cost for one or more remaining jobs may be determined 202. In an embodiment, a first energy cost may be received from a client-based module, which may predict the carbon footprint of the one or more remaining jobs based on the information maintained in the historical database. A first energy cost calculation may be based on a factor relating to an associated electricity usage. Alternatively, a first energy cost calculation may be based on a factor relating to an associated paper output usage.

A remaining job carbon emission value may be determined 203 by a processor based on the first energy cost. The first energy cost may utilize a factor, such as electricity usage, paper output usage and/or the like. Alternatively, the first energy cost may be determined 203 using multiple factors.

The one or more remaining jobs may be performed 204. For example, the one or more remaining jobs may be performed 204 on a printing device and/or the like.

A second energy cost may be determined 205 for the one or more performed jobs. In an embodiment, a second energy cost reflecting actual energy consumed for the one or more performed jobs may be received from a printing device, a marking device-based module, and/or the like. A second energy cost calculation may be based on an amount of electricity used to perform the job and/or an amount of paper output used.

An actual carbon emission value may be determined 206 by a processor based on the second energy cost. For example, the second energy cost may utilize a factor, such as electricity usage, paper output usage and/or the like. Alternatively, the second energy cost may be determined 206 using multiple factors.

In an embodiment, the difference between the actual carbon emission value and the remaining job carbon emission value may be displayed 207, such as on a display screen associated with a processing device. Additional and/or alternate ways of displaying the difference may be used within the scope of this disclosure.

Figure 3:
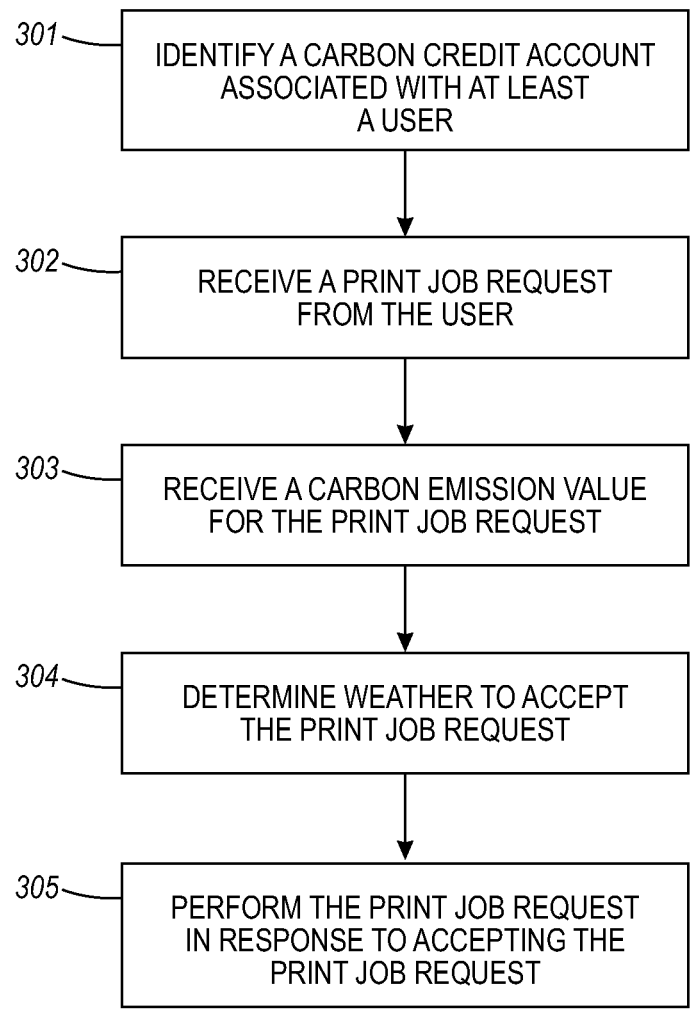
FIG. 3 depicts a flow diagram of an exemplary method of determining acceptability of a print job request associated with a user according to an embodiment.

FIG. 3 depicts a flow diagram of an exemplary method of determining acceptability of a print job request associated with a user according to an embodiment. As shown in FIG. 3, a carbon credit account associated with at least a user may be identified 301 by a processor. The carbon credit account may include a carbon credit amount. For instance, the user may be an employee assigned to a particular project for which a carbon emission target is associated. Alternatively, one or more users may be employees subject to the carbon emission target who have passwords or other authentication based access to specified printing devices. Additionally, a user from a plurality of users assigned to a particular project may have an individual carbon credit amount to track the amount of carbon credits that the user has already used and/or the amount of carbon credits remaining for use by the user for future projects.

A print job request may be received 302 from the user. The print job request may include a request to print a document or a group of documents with specified printing parameters. The printing parameters may include, for example and without limitation, a selection of font, font style, spacing options and/or font size.

A carbon emission value for the print job request may be received 303 from a printing client. A carbon emission value may be identified within a printing client, where an amount of energy used to perform a print job request may be used to determine the carbon emission value. Printing parameters may affect the amount of energy used to perform the print job request.

A processor may determine 304 whether to accept the print job request based on the carbon emission value and the carbon credit amount. For example, a print job request may be accepted if the carbon credit amount is greater than or equal to the carbon emission value.

In an embodiment, the print job request may be modified to yield a modified job having a reduced carbon emission value in response to the carbon credit amount being less than the carbon emission value. For instance, the user may be requested to adjust one or more printing parameters in order to reduce a carbon emission value for a print job such that the carbon emission value is less than or equal to the carbon credit amount for the user. Alternately, the user may reduce the carbon emission value by reducing the resolution of the print job request, printing the job request n-up, and/or printing the job request in draft mode. In an embodiment, the reduced carbon emission value may be determined based on accepting the print job request for a different printing device. In another embodiment, the reduced carbon emission value may be determined based on printing a color job in black and white. The print job request may be accepted in response to the carbon credit amount being greater than or equal to the reduced carbon emission value.

Additionally, in response to accepting the print job request, the print job request may be performed 305 by a printing device. For instance, a printing device may print the print job request using the parameters for the reduced carbon emission value. Alternatively, the printing device may print the print job request with the original parameters if such parameters were acceptable. Additional and/or alternate types of performance for a print job request may also be used within the scope of this disclosure. In an embodiment, the carbon credit account associated with the user initiating the print job request may be updated. For instance, the carbon emission value may be subtracted from the carbon credit amount for the user.

In an embodiment, the printing client may include a client-based module. The client-based module may include a module which is part of a print driver. Alternatively, the client-based module may be separate from a print driver. The client-based module may predict a carbon emission value associated with a print job request for a project based on information stored in a database of previously performed jobs associated with the project. This information may include historical records of factors such as paper usage for previous print jobs and predicted records for remaining jobs. Additional and/or alternate types of client-based modules may also be used within the scope of this disclosure.

Figure 4:
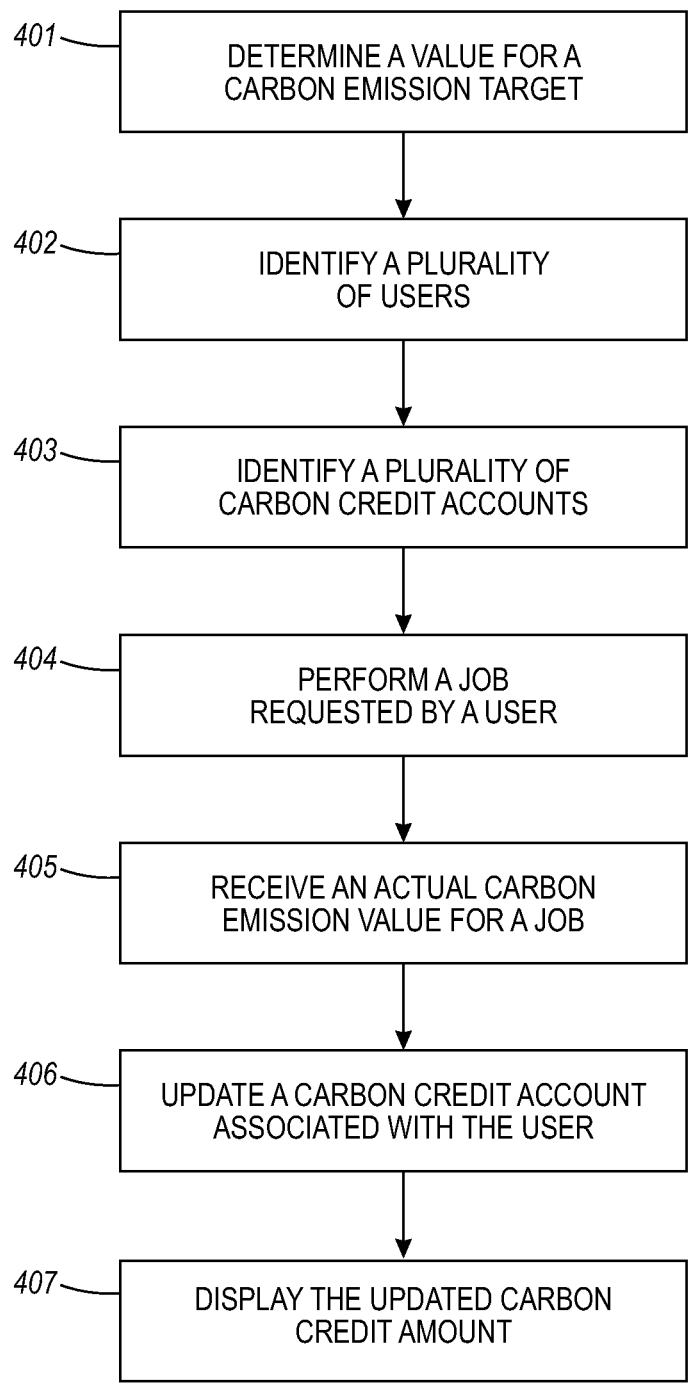
FIG. 4 depicts a flow diagram of an exemplary method of updating a carbon credit account associated with a user according to an embodiment.

FIG. 4 depicts a flow diagram of an exemplary method of determining whether a print job request is acceptable and updating a carbon credit account associated with a user according to an embodiment. As shown in FIG. 4, a value for a carbon emission target may be determined 401. Determination 401 of the value of the carbon emission target may include automatically calculating a value based on information stored in a database. This information may include, without limitation, historical records of one or more factors, such as paper usage for previous print jobs and/or predicted records for remaining jobs.

A plurality of users subject to the carbon emission target and having access to at least one printing device may be identified 402 by a processor. For example, the plurality of users may be employees assigned to a particular project with which the carbon emission target is associated. Alternatively, the plurality of users may be employees subject to the carbon emission target who use passwords, biometrics, and/or the like to access specified printing devices.

A plurality of carbon credit accounts may be identified 403 by a processor. Each carbon credit account may be associated with at least one user. Additionally, each carbon credit account may include a carbon credit amount. A user assigned to a particular project, for example, may have an individual carbon credit amount to track the amount of carbon credits the user has already used and/or the amount of carbon credits that the user can use on future projects.

A user-requested job may be performed 404. For instance, a printing device may print a job associated with a print job request.

An actual carbon emission value for the requested job may be received 405 from the printing device. For example, after the job is performed a realized carbon emission value may be stored on the printing device.

The carbon credit account associated with the user may be updated 406 by a processor based on the actual carbon emission value to provide an updated carbon credit amount. The account may be updated, for example, to reflect a final, realized carbon emission value for the print job request.

The updated carbon credit amount may be displayed 407, such as on a display screen associated with a processing device. Additional and/or alternate ways of displaying the updated carbon credit amount may be used within the scope of this disclosure.

Figure 5:
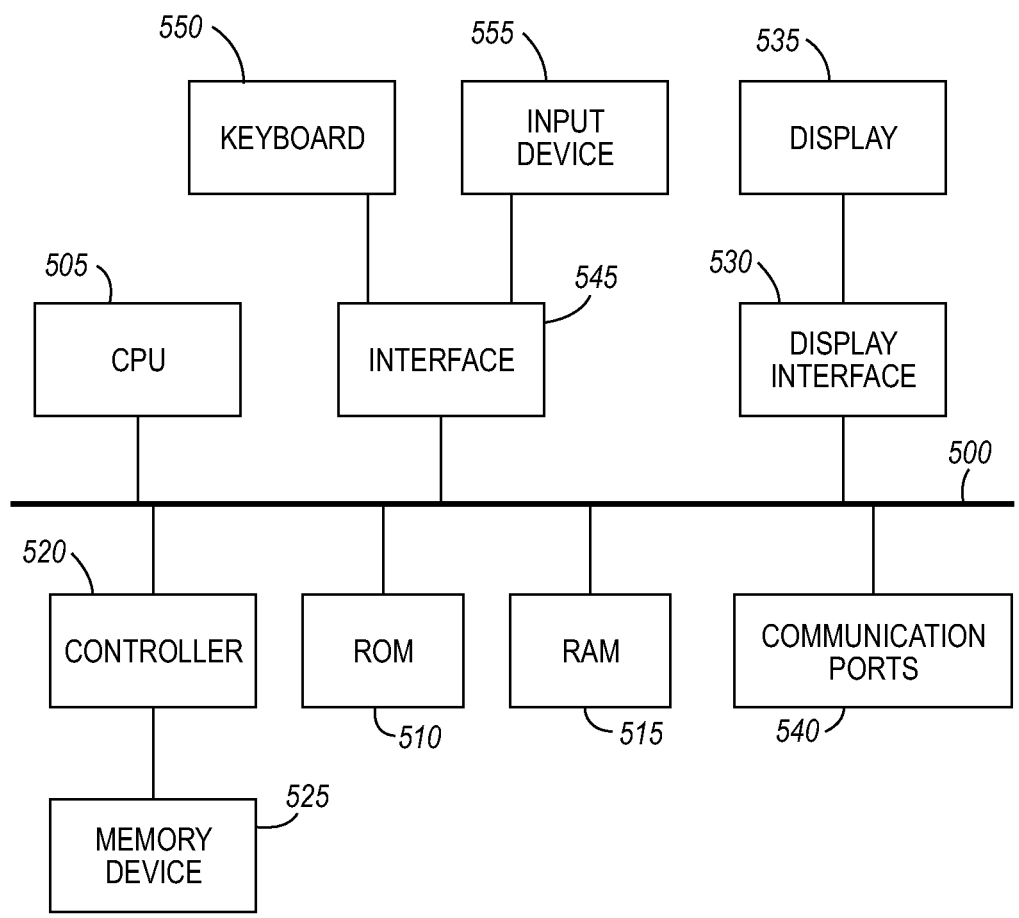
FIG. 5 illustrates a block diagram of an exemplary system for maintaining an overall bank of carbon credits according to an embodiment.

In an embodiment, the actual carbon emission value may be stored. For example, a report containing the actual carbon emission value may be archived. Alternatively, FIG. 5 depicts a block diagram of an exemplary system that may be used to contain or implement program instructions. Referring to FIG. 5, the exemplary system may include internal hardware which may be used to contain or implement program instructions according to an embodiment. A bus 500 serves as the main information highway interconnecting the other illustrated components of the hardware. CPU 505 is the central processing unit of the system, performing calculations and logic operations required to execute a program. Read only memory (ROM) 510 and random access memory (RAM) 515 constitute exemplary memory devices.

In an embodiment, a communication interface may be operably connected to the processor. Further, a computer-readable storage medium including one or more programming instructions may communicate with the processor. A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions may be stored in the ROM 510 and/or the RAM 515. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 530 may permit information from the bus 500 to be displayed on the display 535 in audio, visual, graphic or alphanumeric format. Communication with external devices may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A system, comprising:
   a processor;
   a communication interface operably connected to the processor; and
   a computer-readable storage medium in communication with the processor, wherein the computer-readable storage medium includes one or more programming instructions for:
      identifying a carbon credit account associated with at least a user, wherein the carbon credit account comprises a carbon credit amount,
      receiving a print job request from the user,
      receiving a carbon emission value for the print job request,
      determining whether to accept the print job request based on the carbon emission value and the carbon credit amount, and
      in response to accepting the print job request, printing the print job request.

2. The system of claim 1, wherein determining whether to accept the job request comprises one or more programming instructions for:
   determining whether the carbon credit amount is greater than or equal to the carbon emission value; and
   accepting the print job request in response to the carbon credit amount being greater than or equal to the carbon emission value.

3. The system of claim 1, wherein determining whether to accept the job request comprises one or more programming instructions for:
   determining whether the carbon credit amount is greater than or equal to the carbon emission value;
   in response to the carbon credit amount being less than the carbon emission value, modifying the print job request to yield a modified job request having a reduced carbon emission value; and
   accepting the print job request if the carbon credit amount is greater than or equal to the reduced carbon emission value so that the print job request that is performed comprises the modified job request.

4. The system of claim 3, wherein modifying the print job request comprises one or more programming instructions for:
   determining the reduced carbon emission value based on reducing the resolution of the print job request.

5. The system of claim 3, wherein modifying the print job request comprises one or more programming instructions for:
   determining the reduced carbon emission value based on printing the print job request n-up.

6. The system of claim 3, wherein modifying the print job request comprises one or more programming instructions for:
   determining the reduced carbon emission value based on printing the print job request in draft mode.

7. The system of claim 3, wherein modifying the print job request comprises one or more programming instructions for:
   determining the reduced carbon emission value based on accepting the print job request for a different printing device.

8. The system of claim 3, wherein modifying the print job request comprises one or more programming instructions for:
   determining the reduced carbon emission value based on printing a color job in black and white.

9. The system of claim 1, further comprising one or more programming instructions for updating the carbon credit account associated with the user initiating the print job request.

10. A method for determining acceptability of a print job request associated with a user, comprising:
    identifying, via a processor, a carbon credit account associated with at least a user, wherein the carbon credit account comprises a carbon credit amount,
    receiving a print job request from the user,
    receiving, from a printing client, a carbon emission value for the print job request,
    determining, via the processor, whether to accept the print job request based on the carbon emission value and the carbon credit amount, and
    in response to accepting the print job request, performing, via a printing device, the print job request.

11. The method of claim 10, wherein the printing client comprises a client-based module, and wherein the client-based module comprises a module which is part of a print driver.

12. The method of claim 10, wherein the printing client comprises a client-based module, and wherein the client-based module comprises a separate module from a print driver.

13. The method of claim 10, wherein determining whether to accept the print job request comprises:
    determining whether the carbon credit amount is greater than or equal to the carbon emission value; and
    accepting the print job request in response to the carbon credit amount being greater than or equal to the carbon emission value.

14. The method of claim 10, wherein determining whether to accept the print job request comprises:
    determining whether the carbon credit amount is greater than or equal to the carbon emission value;
    in response to the carbon credit amount being less than the carbon emission value, modifying the print job request to yield a modified job request having a reduced carbon emission value; and
    accepting the print job request if the carbon credit amount is greater than or equal to the reduced carbon emission value so that the print job request that is performed on the printing device comprises the modified job request.

15. The method of claim 14, wherein modifying the print job request comprises:
    determining the reduced carbon emission value based on reducing the resolution of the print job request.

16. The method of claim 14, wherein modifying the print job request comprises:
    determining the reduced carbon emission value based on printing the print job request n-up.

17. The method of claim 14, wherein modifying the print job request comprises:

determining the reduced carbon emission value based on printing the print job request in draft mode.

18. The method of claim 14, wherein modifying the print job request comprises:
determining the reduced carbon emission value based on accepting the print job request for a different printing device.

19. The method of claim 14, wherein modifying the print job request comprises:
determining the reduced carbon emission value based on printing a color job in black and white.

20. The method of claim 10, further comprising updating the carbon credit account associated with the user initiating the print job request.

\* \* \* \* \*